United States Patent
Beugelsdyk et al.

[19]

[11] Patent Number: 6,070,487
[45] Date of Patent: Jun. 6, 2000

[54] PANEL MOUNT CABLE CONTROL ASSEMBLY

[75] Inventors: Anthony F. Beugelsdyk; Michael A. Barnard, both of Wichita, Kans.

[73] Assignee: Wescon Products Company, Wichita, Kans.

[21] Appl. No.: 08/968,417

[22] Filed: Nov. 12, 1997

[51] Int. Cl.[7] ....................................................... F16C 1/10
[52] U.S. Cl. ............................................. 74/502.2; 74/527
[58] Field of Search ................................... 74/502.2, 527, 74/473.25, 502.4, 502.6, 501.5 R; 403/329, 326

[56] References Cited

U.S. PATENT DOCUMENTS

| | | | |
|---|---|---|---|
| 3,427,894 | 2/1969 | Tschanz | 74/502.4 |
| 4,038,508 | 7/1977 | Mapelsden | 74/527 X |
| 4,813,214 | 3/1989 | Barnard et al. | 74/502.2 X |
| 4,903,541 | 2/1990 | Shiota | 74/502.6 X |
| 5,321,994 | 6/1994 | Barnard | 74/502.2 |

FOREIGN PATENT DOCUMENTS

| | | | |
|---|---|---|---|
| 833739 | 4/1960 | United Kingdom | 74/527 |
| 2012893 | 8/1979 | United Kingdom | 74/502.2 |

*Primary Examiner*—Mary Ann Battista
*Attorney, Agent, or Firm*—Hovey, Williams, Timmons & Collins

[57] ABSTRACT

A cable control assembly snaps into a control panel of a lawn mower or other piece of equipment to thereby enclose the opening in the control panel into which the assembly is received. The cable control assembly hereof includes a case and a shifter which is engaged by a detent spring, the case including a rim and at least one resilient snap for holding the margin of the control panel surrounding the opening therebetween. The detent spring includes a detent positioned between a pair of divergent arms which engage the case and inhibit transverse movement of the spring in the direction of orientation of the arms during pivotal movement of the shifter.

18 Claims, 2 Drawing Sheets

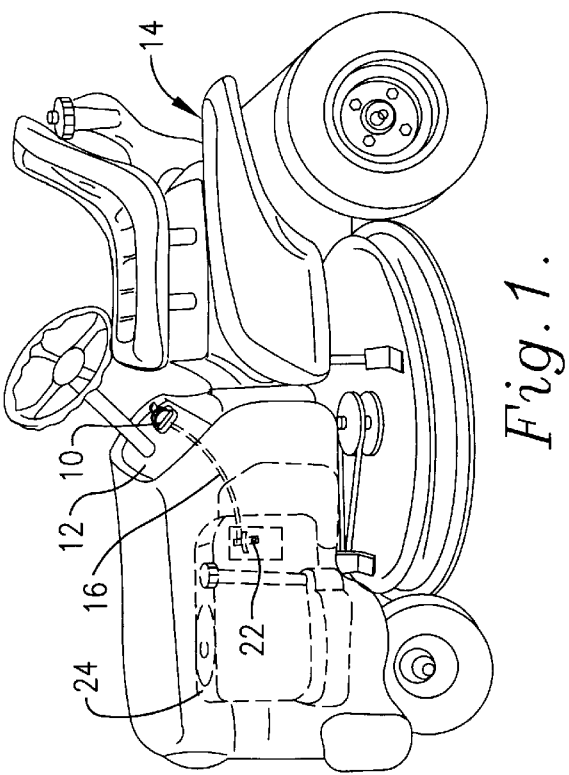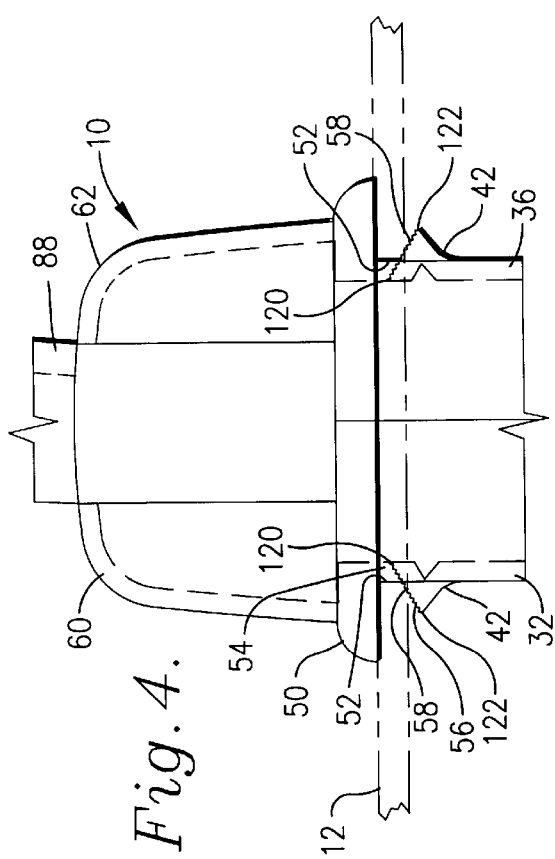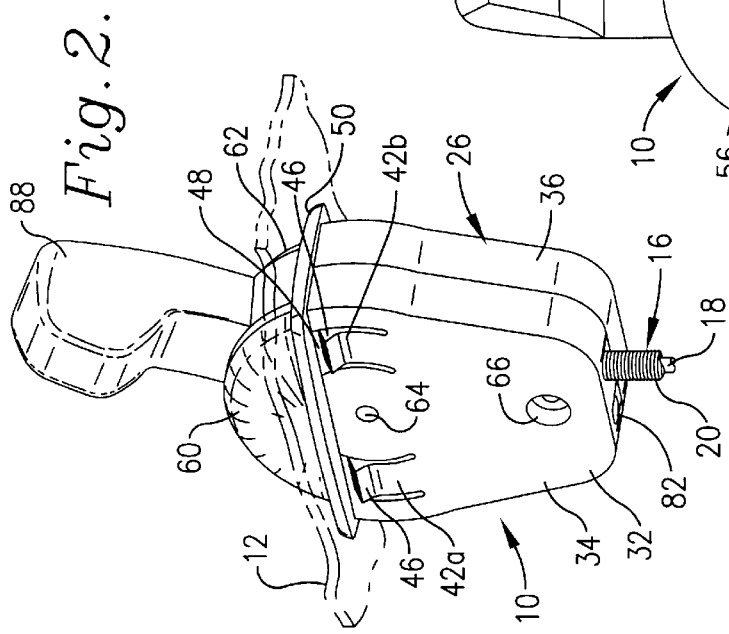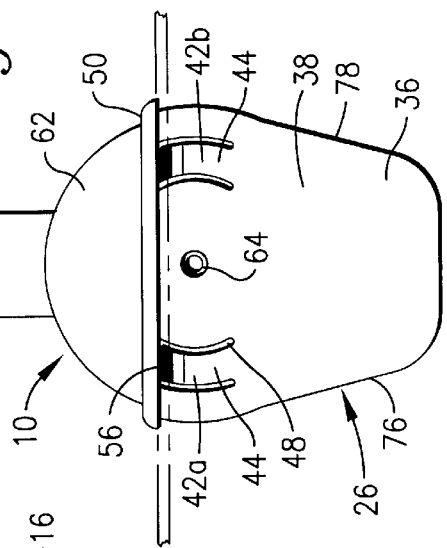

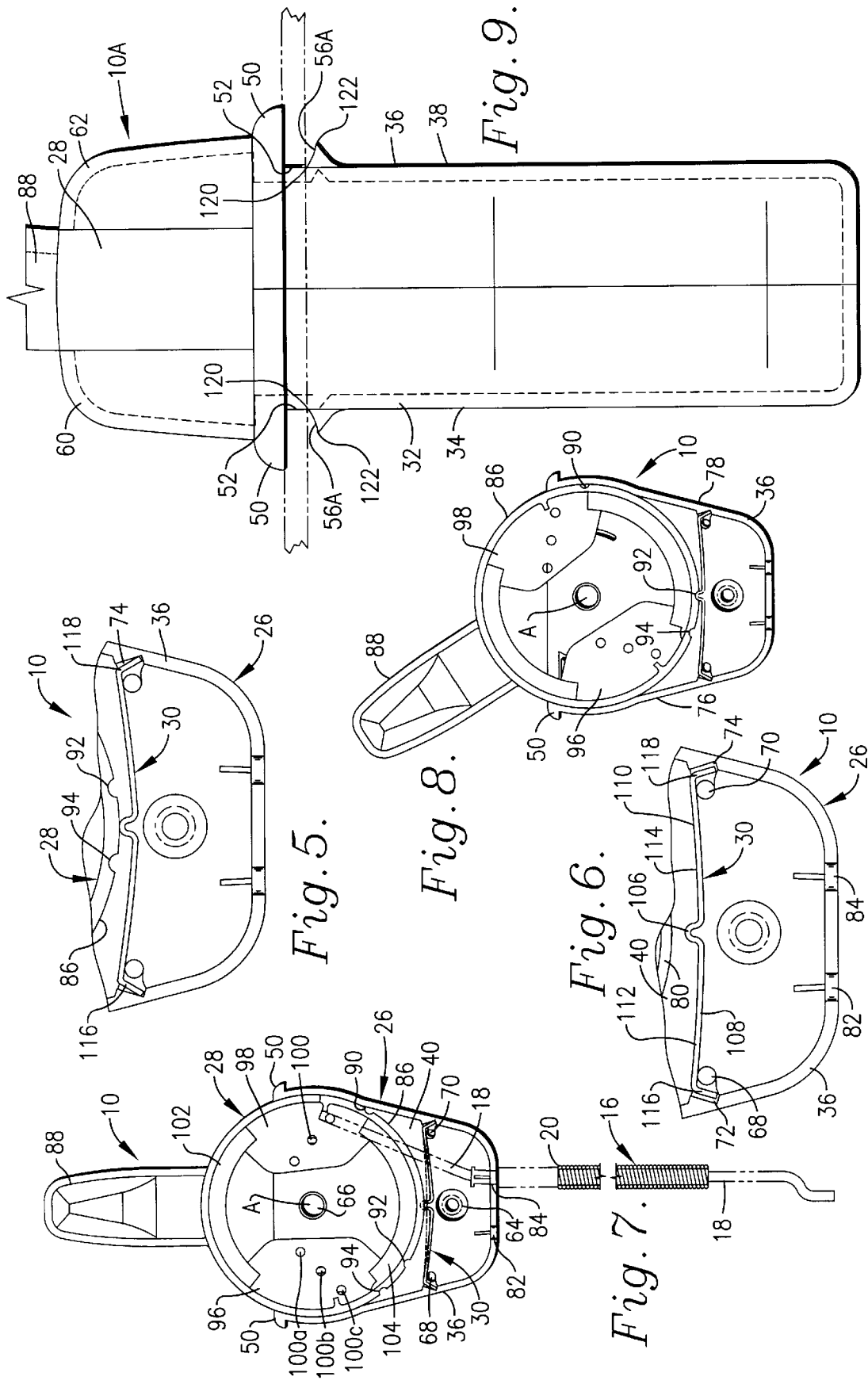

6,070,487

PANEL MOUNT CABLE CONTROL ASSEMBLY

BACKGROUND OF THE INVENTION

1. Field of the Invention

This invention concerns a snap-in cable control assembly for mounting into an opening in a control panel. More particularly, it is concerned with a shiftable cable control assembly which includes a detent spring which resists undesired movement of the shifter.

2. Description of the Prior Art

The use of shiftable controls for operating control cables of equipment is well known in connection with lawn mowers, snowmobiles, snow blowers, tillers and a wide variety of other equipment. Such controls and control cables permit the operator to remain at a remote distance from an engine throttle, ground drive transmission, power take-off or other equipment. It is also known to mount cable controls in openings provided in control panels.

However, the mounting of such cable controls has required additional fittings such as mounting brackets and the associated fasteners such as screws, nuts or bolts to hold the cable control in place. One circumstance necessitating such fittings has been that the openings for receiving the cable controls are not precision parts justifying precise tolerances. Accordingly, fastening the cable control into the opening required these fittings and additional labor, resulting in additional expense. Any additional expense which does not yield any direct improvement in performance, safety or efficiency adds little value to the consumer, even though in the past these parts and labor have been necessary.

Another goal of cable controls has been the minimization of so-called slop or play in the control during use. This has been particularly true in the case of cable controls with a lever presenting an arcuate surface with detents arranged along the arcuate surface due to the particularly configuration of the spring used therewith. Such arcuate surfaces provide a good "feel" and smooth shifting function which is desirable in certain control applications. If the cable control shifts excessively due to vibration or the like, the cable may move a sufficient distance to affect the throttle, ground drive speed or other controlled apparatus.

There is thus a need for a cable control which provides a positive snap-in connection for mounting in a control panel opening with a minimum of labor, and also for a cable control which has an arcuate detent surface but minimizes free play and retains the position of the shifter against undesired movement.

SUMMARY OF THE INVENTION

These and other problems are largely met by the panel mount cable control assembly in accordance with the present invention. That is to say, the panel mount cable control assembly provides structure which permits quick and efficient snap-in mounting of the assembly into openings not requiring tight tolerances, holds the control assembly securely in place, and substantially eliminates unwanted play in the shifter and consequent undesired shifting of the control cable.

Broadly speaking, the cable control assembly hereof broadly includes a case provide in connectable first and second portions, a shifter pivotally received by the case, and a spring received within the case for engagement with the shifter. A Bowden cable assembly including a sheath and a control cable attached to the shifter permits the cable control assembly to operate a remote apparatus such as the throttle on the carburetor of an engine of a riding lawn mower.

Advantageously, the case presents opposing sidewalls with at least one integrally formed snap on each opposing sidewall. Each snap cooperates with a circumscribing rim on the case to hold the margin around the opening of a control panel therebetween. The snap presents a plurality of transverse ridges therealong, one of which will grippingly engage the margin of the opening, thereby holding the panel mount cable control assembly securely in the opening. Alternatively, the snap presents a concave engagement surface which accommodates variations in tolerance of the opening. Preferably, a pair of snaps are positioned in spaced relationship along each sidewall to provide additional stability against rocking of the mounted cable control assembly.

The spring is formed to be initially loosely received in the case, the spring being preferably configured with ears on each end thereof. Upon engagement with the shifter when inserted, the ears are spread to engage the case and hold the detent spring in position. Because the spring and its detent are then substantially fixed, the slop or free play of the shifter is eliminated.

As a result of the configuration of the assembly of the present invention, certain advantages are obtained. First, the assembly involves only a minimum of parts which are inexpensively fabricated and assembled. Second, by virtue of the design of the control assembly, the Bowden cable may be attached in either a positive action or negative action location to permit greater versatility for a single control design. Third, the assembly is easily attached to the control panel of the equipment, such as a riding lawn mower, with a minimum of labor, no additional fasteners, and without the need for tools. Fourth, the assembly substantially encloses the opening into which it is received, thereby virtually eliminating drafts carrying hot air and debris which might otherwise be directed toward the operator and reducing noice which would otherwise be conveyed to the operator through an opening. Fifth, the assembly is designed to efficiently minimize free play or slop in the control by the configuration and placement of the detent spring in the cavity of the case, nonetheless achieving firm and positive engagement between the detent and the arcuate surface of the shifter.

These and other advantages of the panel mount cable control assembly hereof will be appreciated by those skilled in the art with reference to the drawings and descriptions set forth herein.

BRIEF DESCRIPTION OF THE DRAWINGS

FIG. 1 is a perspective view of a panel mount cable control assembly mounted in the control panel of a riding lawn mower showing a Bowden cable assembly connected to the throttle of the engine of the mower;

FIG. 2 is a perspective view showing the panel mount cable control assembly hereof mounted in a control panel, showing the Bowden cable assembly extending downwardly therefrom;

FIG. 3 is a side elevational view of the panel mount cable control assembly hereof, with the surrounding control panel shown in phantom lines;

FIG. 4 is an enlarged end elevational view of the panel mount cable control assembly hereof, showing the snaps presenting ridges thereon in engagement with the surrounding control panel, shown in phantom lines;

FIG. 5 is an enlarged fragmentary vertical cross-sectional view of the panel mount cable control assembly hereof, showing the spring engaged with the arcuate surface of the shifter;

FIG. 6 is an enlarged fragmentary vertical cross-sectional view of the panel mount cable control assembly similar to FIG. 5 but showing the position of the spring prior to insertion of the shifter;

FIG. 7 is a vertical cross sectional view of the panel mount cable control assembly showing the control cable of the Bowden cable assembly received in one of two alternate slots in the case and connected to the shifter in one of a plurality of alternate receiving holes;

FIG. 8 is a vertical cross-sectional view of the panel mount cable control assembly similar to FIG. 7, with the shifter pivoted within the case to an alternate position; and FIG. 9 is an enlarged end view similar to FIG. 4 of an alternate embodiment of the cable control assembly hereof showing snaps having an engagement surface presenting a concavity thereon in contact with the surrounding margin of the control panel

DESCRIPTION OF THE PREFERRED EMBODIMENT

Referring now to the drawing, a panel mount control cable assembly 10 in accordance with the present invention is shown mounted in the control panel 12 of a riding lawn mower 14 in FIG. 1. The panel mount control cable assembly 10 is connected to a conventional Bowden cable 16 which, as illustrated in FIG. 2, includes a control cable 18 and a sheath 20, as well as various fittings or ties (not shown) for securing the sheath 20 along its length to the lawn mower 14. Although a lawn mower 14 is shown by way of illustration, it is to be understood that the panel mount control cable assembly hereof is useful in connection with other operated equipment such as tractors, snowblowers, snowmobiles or any other equipment having controlled apparatus thereon. In the illustration shown in FIG. 1, the Bowden cable 16 connects the panel mount control cable assembly 10 to the throttle 22 of the engine 24 of the lawn mower 14, but it may be appreciated that such use is by way of example only and the assembly 10 could be connected to a ground drive engagement, mower deck height adjustment, power take-off or other attachment requiring control input.

In greater detail, the panel mount cable control assembly 10 hereof includes a case 26, a shifter 28 and a detent spring 30, shown in FIGS. 5 through 8. The shifter 28 is pivotally received in the case 26 and is coupled to the control cable 18 as shown in FIG. 7. The detent spring 30 is held between the case 26 and the shifter 28 to hold the shifter in one of a plurality of preselected positions through the shifter's range of movement.

The case 26 is preferably molded of resilient synthetic resin material and includes a first portion 32 having a first upright wall 34 and a second portion 36 having a second upright wall 38 spaced from the first wall 34 and defining a cavity 40 therebetween. Each wall 34 and 38 preferably includes an integrally formed resilient snap 42, with a pair of snaps 42a and 42b being most preferably located on each wall 34 and 38. Each snap 42 includes an arcuate resilient arm 44 and a projection 46. The snap 42 is permitted to move inwardly toward and outwardly away from the cavity by slit 48 which extends upwardly along each side of and across the top of the snap 42 to separate the snap 42 from the remainder of the wall 34 or 38 except along the bottom of the arm 44, as best seen in FIG. 3. The case 26 further includes a circumscribing rim 50 located above the projections 46. The control panel 12 presents a margin 52 defining the opening 54 into which the assembly 10 is received, with the margin 52 located between the projections 46 and the rim 50 when the assembly 10 is mounted.

Each projection 46 preferably includes an engagement surface 56 which is oriented toward the rim 50 to receive the margin 52 therebetween and has an upper edge 120 and an outer edge 122. The engagement surface 56 may include a plurality of transversely oriented ridges 58 between which the margin 52 may be held. Because each snap 42 acts independently and the engagement surface is angled upwardly and inwardly as shown in FIG. 4, the opening 54 need not be symmetrical or of close tolerance.

Each portion 32 and 36 of the case 26 further includes a raised half-dome 60, 62 respectively. The half-domes 60 and 62 extend upwardly from the rim 50 and engage the shifter 28 along either side thereof. The half-domes 60 and 62, rim 50 and shifter 28 in combination substantially enclosing the opening 54 into which the assembly 10 is received.

The first portion 32 and second portion 36 snap together using pronged projections 64 and complementally sized receivers 66 which extend into the cavity 40 for interconnecting. In addition, at least one of the first portion 32 and second portion 36 include first and second inwardly oriented pins 68, 70, and first and second notches 72, 74 defined in the interior of the ends 76 and 78 of the case 26 for receiving the detent spring 30. Each portion 32 and 36 further includes an arcuate bearing wall 80 thereon for supporting the shifter 28 and permitting pivotal motion thereof relative to the case 26. Slots 8.2 and 84 are further provided in each portion 32 and 36 which together allow the Bowden cable 16 to be alternately placed in either slot 82 or 84, or two different Bowden cables to pass through the case and connected to the shifter 28 in custom applications.

The shifter 28 includes an arcuate engagement wall 86 which is substantially circular in elevation as shown in FIGS. 7 and 8, and a lever 88 for grasping by the user to pivot the shifter 28 within the case 26. The shifter 26 is preferably molded of synthetic resin material and is unitary. The arcuate engagement wall is substantially smooth with the exception of recesses 90, 92 and 94 which may define predetermined stops corresponding to, e.g. throttle positions for "stop", "idle" and "fast", with the possibility of additional stops being available for intermediate positions or a "choke" setting. The lever 88 may be of any configuration desired and limits the range of pivoting travel of the shifter 28 by its engagement with the rim 50 of case 26 at the extremes of desired travel, corresponding in turn to limits of the desired travel of the control cable 18.

The shifter 28 further includes first transversely oriented inner wall 96 and second transversely oriented inner wall 98 extending radially inwardly from arcuate engagement wall 86, each of which are provided with a plurality of attachment holes 100 for the receipt of one end of the control cable 18, with the other end of the control cable being attached to, e.g., throttle 22. The inner walls 96 and 98 are also reinforced and connected by supporting walls 102 and 104 which are parallel to but offset to inner walls 96 and 98. Thus, the plurality of holes 100 on both first inner wall 96 and second inner wall 98 permit flexibility in attaching the control cable 18 in either a positive or negative-action mode and in adjustment in the desired length of travel for the control cable 18 based on which hole 100 is used, with hole 100a being closer to the pivot axis A than holes 100b and 100c and therefore having less range of travel for the control cable 18.

Detent spring 30, preferably of spring steel, includes a detent 106 and first and second arms 108 and 110 which diverge transversely from detent 106 as shown in FIGS. 5 and 6. The arms 108 and 110 include respective stretches 112 and 114 and flanges 116 and 118 which are obliquely angled relative to their respective stretches 112 and 114. The detent 1013 engages arcuate engagement wall 86, and arms 108 and 110 are supported on pins 68 and 70 which holds the detent spring 30 between the case 26 and the shifter 28. Flanges 116 and 118 are initially loosely received in notches 72 and 74 prior to placement of the shifter 28 on bearing wall 80 of case 26 to facilitate initial placement, as shown in FIG. 6. Insertion of the shifter 28 into the case 26 causes the detent 106 to be depressed and spreads flanges 116 and 118 to engage the case 26 surrounding notches 72 and 74 as shown in FIG. 5, thereby resisting transverse shifting of the detent spring 30 relative to the case 26.

FIG. 9 illustrates an alternate embodiment of the panel mount cable control assembly 10A. In cable control assembly 10A, like numbers are used to denote like components which are similar in all respects to the embodiment described above except that the engagement surface 56A is concave instead of being provided with ridges 58, thereby providing an alternate structure for accommodating small differences in the shape or dimensions of the opening 54.

In use, the Bowden cable 16 is placed in a slot 82 or 84 of one of the first or second portions 32 or 36 and one end of the control cable 18 projecting from sheath 20 is bent and inserted into a desired hole 100 of shifter 28. The shifter 28 is received on arcuate bearing wall 86 with the lever 88 projecting upwardly between half-domes 60 and 62 and the first and second portions 32 and 36 of the case are snapped together by the insertion of a projection 64 on each one of the portions into an opposing receiver 66 on the other portion.

When the panel mount cable control assembly 10 is assembled, it may be easily inserted into the opening 54 of the control panel 12 without the use of tools. After passing the free end of the Bowden cable 16 through the opening, the cable control assembly 10 is pushed downwardly until the rim 50 engages the margin 52 surrounding the opening 54. As the assembly 10 is inserted, the arms 44 of the snaps 42 yield to permit the projections 46 to pass through the opening 54 and then resiliently spring back to allow the engagement surface 54 to hold the margin 52 of the control panel 12 between the projection 46 of the snap 42 and the rim 50. The remote end of the control cable 18 may then be attached to the throttle 22 or other controlled device.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

What is claimed is:

1. A cable control assembly comprising:
   a case having first and second portions presenting a cavity therebetween and first and second pins;
   a shifter pivotally mounted to said case and received in said cavity, said shifter including an arcuate engagement wall; and
   a spring positioned in said cavity, said spring including a detent for engaging said arcuate engagement wall and first and second arms divergent from said detent, said first and second pins respectively contacting said first and second arms for holding said detent in engagement with said engagement wall, each of said arms engaging said case for inhibiting shifting of said spring within said case during pivoting of said shifter relative to said case.

2. A cable control assembly as set forth in claim 1, wherein said case includes first and second transversely spaced notches and said first and second arms each include a flange for receipt in respective ones of said notches.

3. A cable control assembly as set forth in claim 1, wherein said arcuate engagement wall includes a plurality of circumferentially spaced recesses sized for receiving said detent of said spring therein.

4. A cable control assembly as set forth in claim 1, wherein said shifter includes at least one radially oriented inner wall presenting a plurality of holes for receiving a control cable in one of said holes.

5. A panel mount cable control assembly comprising:
   a case having separable first and second portions presenting a cavity therebetween;
   a shifter pivotally mounted to said case and received in said cavity for pivoting about a pivot axis, said shifter including an arcuate engagement wall; and
   an elongated spring presenting a longitudinal axis, carried by said case and positioned in said cavity with said longitudinal axis oriented substantially transverse to said pivot axis, said spring including a detent integrally formed therewith and first and second arms divergent from said detent, each of said arms engaging said case for inhibiting translational shifting of said spring within said case during pivoting of said shifter relative to said case.

6. A panel mount cable control assembly for mounting into an opening defined by a margin in a control panel, comprising:
   a shifter for coupling to a Bowden cable assembly, said shifter presenting an arcuate circumferentially extending engagement wall;
   a case presenting a cavity and mounting said shifter in said cavity for pivotal movement about a pivot axis, said case including a circumscribing rim and first and second spaced walls defining said cavity therebetween, each of said walls having an outer face, each of said walls presenting a snap including a resilient arm and an outwardly oriented projection in spaced relationship to said rim for receiving the margin of the control panel therebetween; and
   an elongated spring presenting a longitudinal axis and carried by said case and positioned in said cavity with said longitudinal axis oriented substantially transverse to said pivot axis, said spring including a detent integrally formed therewith for engaging said arcuate wall and first and second arms divergent from said detent, each of said arms engaging said case for inhibiting translatory shifting of said spring within said case during pivoting of said shifter relative to said case.

7. A panel mount cable control assembly as set forth in claim 6, wherein said case includes first and second transversely spaced notches and said first and second arms each include a flange for receipt in respective ones of said notches.

8. A panel mount cable control assembly as set forth in claim 6, wherein said arcuate engagement wall includes a plurality of circumferentially spaced recesses sized for receiving said detent of said spring therein.

9. A panel mount cable control assembly as set forth in claim 6, wherein said shifter includes at least one radially oriented inner wall presenting a plurality of holes for receiving a control cable in one of said holes.

10. A panel mount cable control assembly for mounting into an opening defined by a margin in a control panel, comprising:

a shifter for coupling to a control cable; and a case having a rim, said case including separable first and second portions each having a respective upright wall angularly oriented relative to said rim, said first and second portions being connected to define a cavity for pivotally receiving said shifter therebetween, each said wall of said first and second portions including a first resilient snap integrally formed therein, each of said snaps including a resilient arm for permitting movement of said snap inwardly toward and away from said cavity and a projection located in spaced relationship to said rim for receiving the margin of the control panel therebetween.

11. A panel mount cable control assembly as set forth in claim 10, wherein said projection includes an engagement surface presenting at least one transversely oriented ridge thereon.

12. A panel mount cable control assembly as set forth in claim 10, wherein said projection includes a concave engagement surface thereon oriented generally toward said rim and extending between an upper edge and an outer edge, said concave engagement surface being substantially continuously smooth and ridgeless between the upper edge and the outer edge.

13. A panel mount cable control assembly as set forth in claim 10, each said wall further including a second resilient snap thereon, said second snap including an outwardly oriented projection in spaced relationship to said rim for receiving the margin of the control panel between said second snap and said rim.

14. A panel mount cable control assembly as set forth in claim 10, said first wall including a pair of said snaps in transversely spaced relationship and said second wall including a second pair of said snaps in transversely spaced relationship, each of said snaps including a resilient arm and outwardly oriented projection integrally formed with said case.

15. A panel mount cable control assembly as set forth in claim 10, wherein said rim circumscribes said case.

16. A panel mount cable control assembly as set forth in claim 10, including a detent spring received in said case and located in engagement with said shifter.

17. A panel mount cable control assembly as set forth in claim 10, wherein said shifter includes at least one radially oriented inner wall presenting a plurality of holes for receiving a control cable in one of said holes.

18. A panel mount cable control assembly as set forth in claim 10, wherein said first and second portions of said case each include a half-dome which extends from said rim and receives a portion of said shifter therebetween to substantially enclose said cavity.

* * * * *